March 2, 1971   H. L. WILLIAMS   3,567,180
FABRICATED VALVE AND METHOD OF MAKING THE SAME
Filed Sept. 19, 1969   2 Sheets-Sheet 1
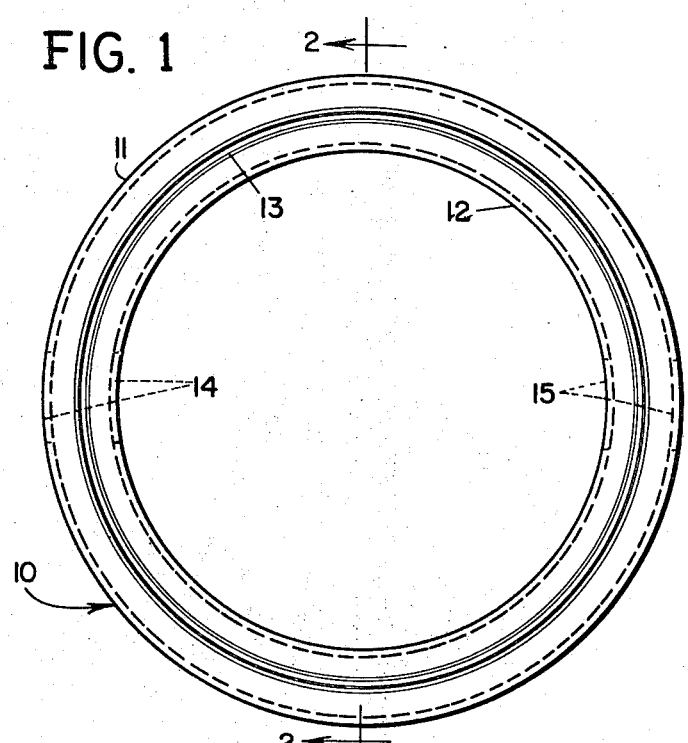
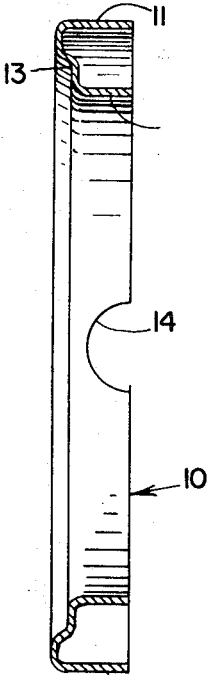
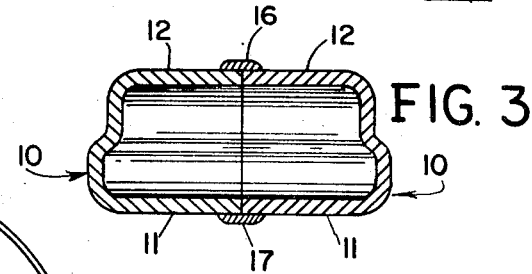
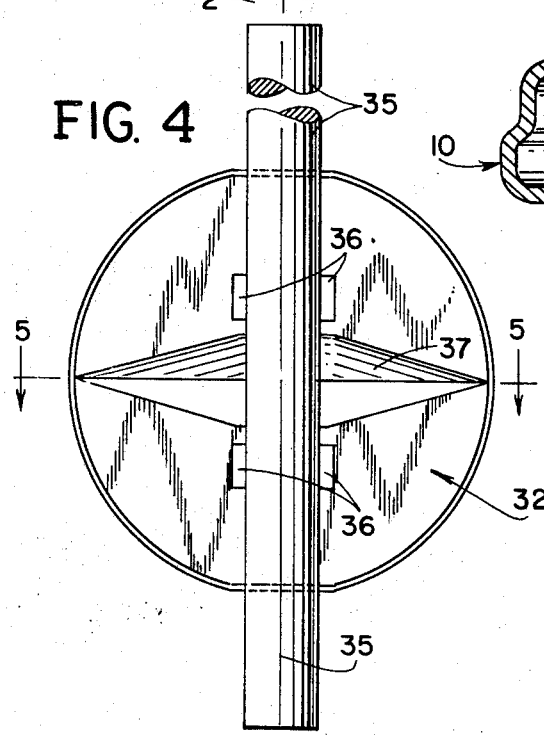
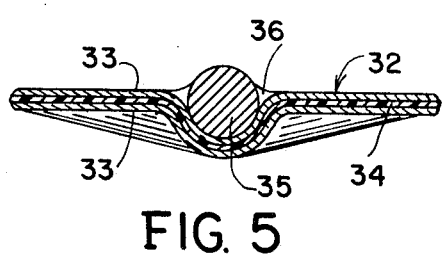

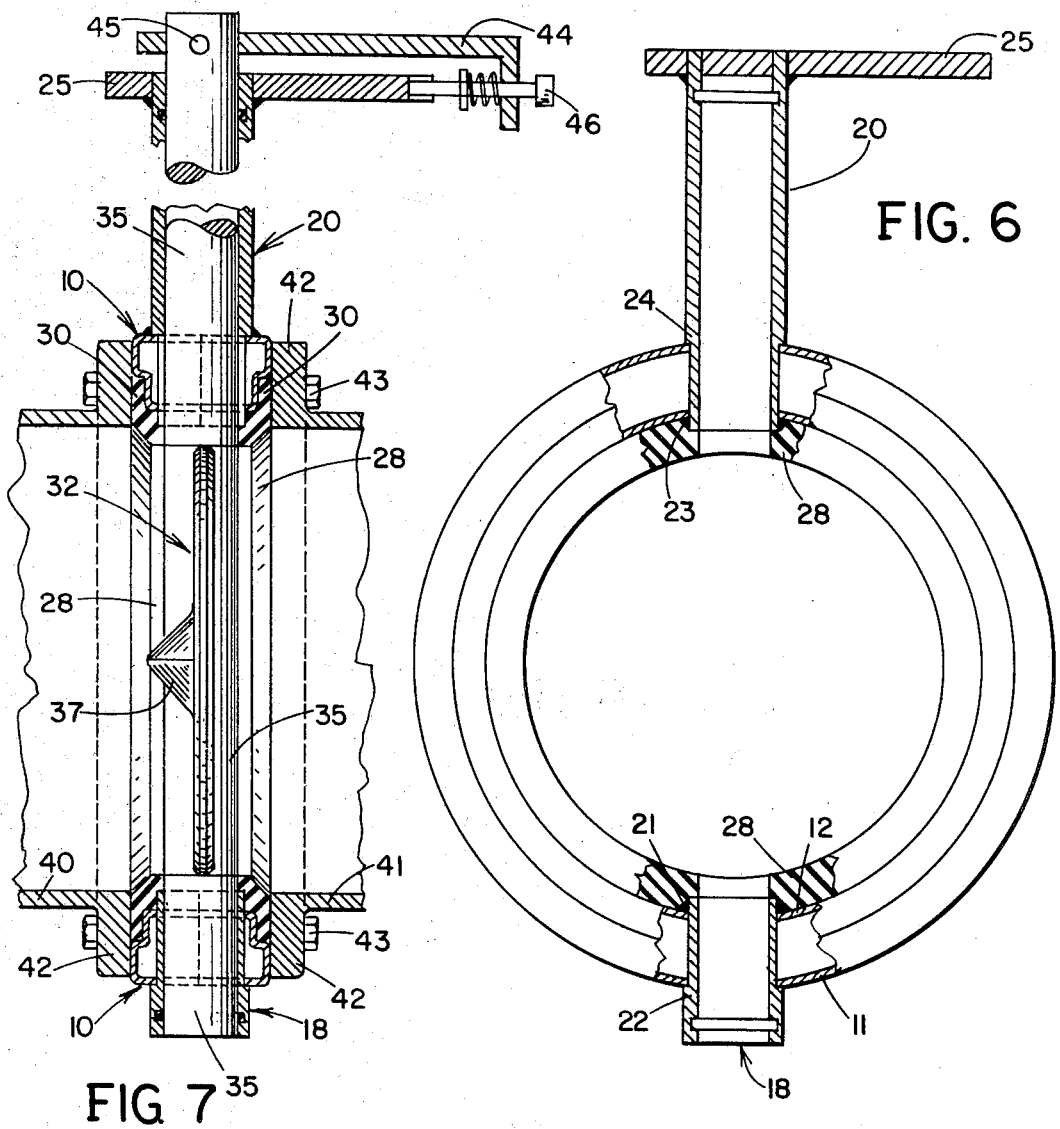
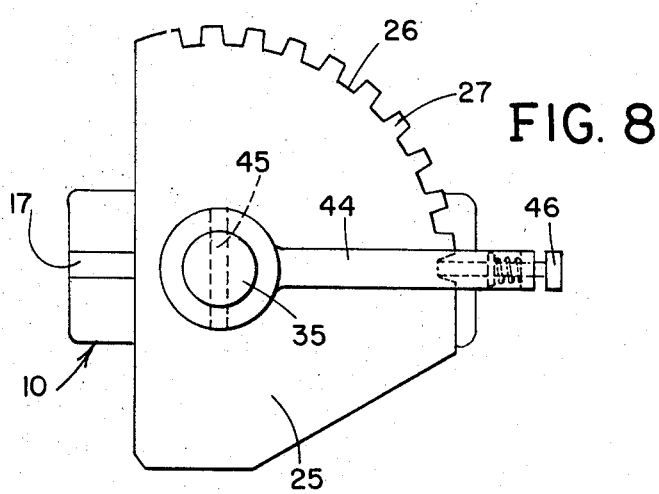

United States Patent Office 3,567,180
Patented Mar. 2, 1971

3,567,180
FABRICATED VALVE AND METHOD OF
MAKING THE SAME
Hubert L. Williams, Hinsdale, Ill., assignor to
Crane Co., Chicago, Ill.
Filed Sept. 19, 1969, Ser. No. 859,412
Int. Cl. F16k 1/22; B21d 51/00
U.S. Cl. 251—306                                    7 Claims

ABSTRACT OF THE DISCLOSURE

This invention relates to a fabricated hollow annular body for use as a valve body or the like and to a method of producing the same. The valve body is formed by one or more stamping operations on a piece of metal to form a half section which is annular or ring like in form. Two such half sections are placed in back to back relation and welded together to form the hollow annular valve body. Journalling members are welded in place on the valve body and a valve shaft carrying a valve disc is mounted by the journalling members for rotation.

GENERAL BACKGROUND AND DESCRIPTION

The invention relates to valves and has reference more particularly to butterfly valves that can be conveniently and economically formed from metal stampings.

An object of the invention is to provide an improved valve structure and a method of producing the same which will only require a limited number of relatively simple stamping operations followed by several welding steps so that the manufacturing procedures are relatively simple and economical. However, the valve device produced in accordance with the invention will be strong and rugged in its finally completed form and the same will be durable in operation and capable of a long service-free life.

The butterfly type of valve is suitable for widespread applications due to its simplicity, dependability and efficiency in operation as a valve device. Butterfly valve structure basically consists of an annular valve body having a flow passage therethrough and a relatively flat circular disc mounted in the flow passage. When the disc is rotated to the position where it is substantially perpendicular to the axis of the flow passageway opening, the same is closed preventing fluid flow therethrough. To move the disc to fully open position only requires a ninety degree turn of the disc.

In accordance with the invention, the annular body of the valve is formed by stamping operations which produce two annular half portions which are then placed in contact and welded together. The hollow valve body as thus fabricated has mechanical and physical properties adequate to meet the bolting and other stresses to be encountered which equal or exceed the mechanical properties of valve bodies formed by iron casting methods. The stamping operations of the invention make possible the economical production of valve bodies of various sizes and configuration and also various metals such as low carbon steel or corrosion resistant stainless steel can be used.

With these and various other objects in view, the invention may consist of certain novel features of construction and operation, as will be more fully described and particularly pointed out in the specification, drawings and claims appended thereto.

BRIEF DESCRIPTION OF THE DRAWING

In the drawings which illustrate an embodiment of the device and wherein like reference characters are used to designate like parts:

FIG. 1 is a front elevational view of a half section stamping for an annular valve body such as may be used in the production of a butterfly valve;

FIG. 2 is a vertical sectional view taken substantially on line 2—2 of FIG. 1 and showing the transverse configuration of the hollow annular stamping of FIG. 1;

FIG. 3 is a transverse sectional view showing the hollow valve body which results from the welding together of two half sections such as shown in FIGS. 1 and 2;

FIG. 4 is a rear elevational view showing a valve disc secured to a valve shaft, the combination being designed for use with the butterfly valve body of the invention;

FIG. 5 is a transverse sectional view of the valve disc and shaft combination, taken substantially on line 5—5 of FIG. 4;

FIG. 6 is a front elevational view of the valve body structure of the invention showing the trunnion members and resilient lining in place on the fabricated valve body;

FIG. 7 is a vertical sectional view showing a complete valve device of the butterfly type and which embodies the improvements of the invention; and FIG. 8 is a top plan view showing the operators mounting plate and handle for the valve device of FIG. 7.

EXEMPLARY EMBODIMENTS

The first step in the production of a valve body for a butterfly type of valve as contemplated by the invention resides in a stamping operation on a flat metal piece substantially ring-like or doughnut shaped in plan and which shapes the metal piece in such manner as to form the half section 10 of FIGS. 1 and 2. The annular half section 10 is, of course, hollow and has an outer wall 11 and inner wall 12 and an arcuate connecting wall portion 13. The connecting wall portion 13 is of special configuration so as to give the desired shape to the completed hollow valve body. It will also be understood that semi-circular openings 14 and 15 are formed in the annular half section 10 the same being disposed diametrically for receiving trunnion members which are welded in place as will be presently described.

The next step in the manufacturing procedures for the valve body is to place two of the half sections in back-to-back relation and fixedly join the sections together by a welding step. As shown in FIG. 3, the weld metal 16 is deposited on the inside walls of the annular hollow body at the joint for welding together the inside walls 12. In a similar manner weld metal 17 is deposited on the outside walls 11 for welding the outside walls of the annular body together. In placing the two half sections 10 in back-to-back relation, the semi-circular openings 14 and 15 are, of course, aligned. As a result, openings through the same are provided in the annular valve body and the same are diametrically aligned. The weld 16 or 17 between body halves may be continuous or of the spot type.

The openings 14 and 15 receive and mount the journalling members 18 and 20 as best shown in FIG. 6. The bottom journalling member 18 is inserted in the aligned openings 14 in the walls 11 and 12 of the valve body and the member is welded in place at 21. The journalling member 18 is exteriorly shaped to provide a shoulder 22 which engages the outside walls 11 and forms a stop limiting the extent of insertion of the member. The top journalling member 20 is generally longer than member 18 but the same is inserted in the aligned openings 15 in the same manner and welded in place at 23. The shoulder 24 formed on member 20 engages the outside walls 11 and acts as a stop limiting the extent of insertion of said top member. An operator's mounting plate or platform 25 is suitably fixed as by welding or in any other manner to the top end of the trunnion member 20. The platform as shown in FIG. 8 is provided with notches 26 which form the teeth 27 for a ninety degree arc on one side of the platform. The utility of the notches will become apparent as the description proceeds.

FIG. 6 shows the inside walls 12 of the valve body as protected by a resilient liner designated by the numeral 28. It is customary to equip the valve body of butterfly valves with a resilient liner of elastomer, rubber or the like for successful coaction with the valve disc. Otherwise a metal-to-metal contact between the valve disc and the valve body would result and in the past this has generally been found to be objectionable. The resilient liner is located over the inside walls 12 and lips or flanges 30 are provided as integral extensions of the resilient liner for location in the annular recesses formed by the configurations 13. The resilient liner may be molded in place on the inside surfaces of the valve member or by machining away most of the weld metal 16 a replaceable liner may be employed. It is understood, however, that the fabricated body disclosed herein may utilize a metal seat or leakage type of arrangement between the closure member and seat, commonly referred to as a damper valve.

The valve disc 32 for the fabricated valve body is shown in FIGS. 4 and 5, the same comprising a substantially flat circular disc of metal having a size which will fit within the fluid flow passage provided by the resilient liner 28 and properly coact therewith for controlling said flow. A preferred construction for the valve disc 32 is shown in FIG. 5 wherein it will be observed that a laminated structure is provided, the same employing outer metal discs 33 having a layer of rubber or plastic 34 located between. The laminated valve disc is bent or formed along a diameter with a semi-circular recess or groove which is adapted to receive the valve stem 35. The invention contemplates that the valve disc 32 will be secured to the valve stem by welding as at 36. Several welds can be made on the back side of the valve disc which is the open side of the groove. Also for reinforcing and strengthening the valve disc the same may be formed with the diametrical rib 37. It is also noted that the fabricated disc, as disclosed herein, may be used with a cast valve body, and, conversely, the cast disc may be used with a fabricated valve body.

In assembling the complete valve device as shown in FIG. 7, the next step in the procedure following the mounting and welding of the journalling members 18 and 20 and the insertion of the resilient liner 28, is to insert the valve stem 35 in the top and bottom journalling members. After the valve stem has been journalled and properly positioned, the valve disc 32 is associated therewith and welded in place as described. The completed valve device can then be bolted to pipe or conduit sections as shown in FIG. 7. The forward pipe section 40 and the rear pipe section 41 are disposed on respective sides of the valve device and the flanges 42 of the pipe sections are bolted together by the bolts 43.

The valve stem 35 extends above the operator's mounting plate 25 and said projecting end receives the handle part 44 which is pinned to the valve stem by the pin 45. The spring energized latching pin 46 is carried by the handle part 44 and said pin is adapted to seat in one of the notches 26 on the operator's mounting plate 25. By this structure the operator can adjust the open position of the valve disc 32 and then lock the same in the desired adjusted position. The valve disc can also be latched in either a full open or in a fully closed position.

Although the present invention has been described above with a certain degree of particularity with respect to valve bodies, it should be understood that the present disclosure has been made only by way of an example. Consequently, numerous changes in the details of construction and the combination and arrangement of components, as well as the possible modes of utilization, will be apparent to those skilled in the art and may be resorted to without departing from the spirit and scope of the invention as claimed.

I claim:

1. A method of fabricating a hollow annular body portion for use as a valve body for a butterfly type of valve, the steps comprising forming a half section of the hollow annular body portion by stamping operations on a workpiece of metal or other suitable material, placing two of said half sections in back-to-back relation and joining the sections together as by welding, forming a pair of diametrically aligned openings in the walls of the joined sections, positioning tubular journalling members in the aligned openings respectively, and mounting a valve stem in the journalling members for rotation with respect to the valve body.

2. A method as defined by claim 1, including the additional step of fixing as by welding a valve disc to the valve stem so that the valve disc is adapted to control the opening and closing of the circular passage provided by the annular valve body.

3. In a method of fabricating a butterfly type of valve having a valve body, a valve stem and a valve disc, the steps comprising forming half sections of the valve body by stamping operations on a workpiece of metal or other suitable material, whereby each half section is annular and includes an inside wall, an outside wall and a connecting wall portion, placing two of said half sections in back-to-back relation and joining the sections together as by welding to form a hollow annular valve body, forming a pair of diametrically aligned openings in the walls of the joined sections, positioning tubular journalling members in the aligned openings respectively and fixedly securing the same in place, mounting a valve stem in the journalling members for rotation with respect to the valve body, and fixing a valve disc to the valve stem between the said journalling members.

4. In a method of fabricating a butterfly type of valve having a valve body, a valve stem and a valve disc as defined by claim 3, whereby the placing of the two half sections in back-to-back relation lines up the inside and outside walls of one section with the inside and outside walls of the other section, and whereby the sections are joined by welding the contacting walls together.

5. In a method of fabricating a butterfly type valve having a valve body, a valve stem and a valve disc as defined by claim 4, wherein the stamping operations on each half section forms a connecting wall portion having a special configuration.

6. A fabricated valve device of the butterfly type, in combination, a hollow valve body of annular shape formed of two half-sections produced by stamping operations welded together in back to back relation, whereby the valve body includes an inside circular wall, an outside circular wall and connecting wall portions on each side, a bottom and a top journalling member positioned in the valve body in spaced diametrically opposite locations, a valve stem rotatably mounted by the journalling members, and a valve disc fixedly secured to the valve stem and located between the journalling members.

7. A fabricated valve device of the butterfly type as defined by claim 6, additionally including a resilient liner for the valve body, said liner providing a resilient covering for the inside circular wall of the valve body.

References Cited

UNITED STATES PATENTS

| | | | |
|---|---|---|---|
| 567,011 | 9/1896 | Smith | 251—308X |
| 2,664,098 | 12/1953 | McInerney | 251—366X |
| 2,936,778 | 5/1960 | Stillwagon | 251—306X |
| 3,048,363 | 8/1962 | Garrigan | 251—367X |

FOREIGN PATENTS

| | | | |
|---|---|---|---|
| 1,236,084 | 6/1960 | France | 251—305 |

HENRY T. KLINKSIEK, Primary Examiner

U.S. Cl. X.R.

29—157.1